(12) United States Patent
Shi et al.

(10) Patent No.: US 6,914,237 B2
(45) Date of Patent: Jul. 5, 2005

(54) AUTO-ALIGNMENT SYSTEM WITH FOCUSED LIGHT BEAM

(75) Inventors: Ting Shi, San Jose, CA (US); Dallas Meyer, Danville, CA (US); Alex Klajic, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 6 days.

(21) Appl. No.: 10/150,417

(22) Filed: May 17, 2002

(65) Prior Publication Data

US 2003/0155493 A1 Aug. 21, 2003

Related U.S. Application Data

(60) Provisional application No. 60/357,491, filed on Feb. 15, 2002.

(51) Int. Cl.[7] ............................. H01J 3/14; H01J 40/14; H01J 5/16
(52) U.S. Cl. ............... 250/234; 250/227.11; 250/201.2; 324/158 D
(58) Field of Search ...................... 250/201.2, 227.11, 250/559.1, 234; 324/158 D, 158 R, 158.1; 356/416, 418–419

(56) References Cited

U.S. PATENT DOCUMENTS

| | | | |
|---|---|---|---|
| 4,301,409 A | * 11/1981 | Miller et al. | 324/537 |
| 4,345,148 A | * 8/1982 | Pines et al. | 250/214 C |
| 4,609,291 A | * 9/1986 | Takahashi | 356/418 |
| 4,712,063 A | * 12/1987 | Osterwald et al. | 324/766 |
| 4,875,755 A | 10/1989 | Borgos et al. | |
| 5,581,346 A | * 12/1996 | Sopori | 356/30 |
| 5,677,973 A | 10/1997 | Yuhara et al. | |
| 6,137,105 A | * 10/2000 | Drobot et al. | 250/234 |
| 6,545,261 B1 | 4/2003 | Blake et al. | |
| 6,556,751 B1 | 4/2003 | Lee et al. | |
| 6,590,658 B2 | 7/2003 | Case et al. | |

OTHER PUBLICATIONS

Hickman II et al., "Uniformity and Peformance Characterization of GaN P–I–N Photodetectors Fabricated From 3–Inch Epitaxy," MRS Internet J. Semicond. Res. 4SI, G7.6 (1999).

* cited by examiner

*Primary Examiner*—Stephone B. Allen
*Assistant Examiner*—Patrick J. Lee
(74) *Attorney, Agent, or Firm*—Workman Nydegger

(57) ABSTRACT

Characterizing the surface responsivity of a photo-detector includes focusing a light beam on the photo-detector surface and measuring a response of the photo-detector. The focused light beam is scanned across the surface of the photo-detector. The response of the photo-detector at each position may be recorded to allow the responsivity of the photo-detector surface to be characterized.

17 Claims, 5 Drawing Sheets

AUTO-ALIGNMENT SYSTEM WITH FOCUSED LIGHT BEAM

CROSS-REFERENCE TO RELATED APPLICATION

This application claims priority from U.S. Provisional Application Ser. No. 60/357,491, filed on 15 Feb. 2002.

TECHNICAL FIELD

This disclosure relates to the characterization of photo-detector responsivity.

BACKGROUND

Accurate characterization of high-speed optoelectronic components can be important to the design and implementation of systems such as high-speed optical links. Photo-detector types include, but are not limited to, PIN diodes, avalanche photodiodes (APD), phototransistors, photoconductors and waveguide photo-detectors.

High data rate telecommunications data are often delivered over networks of high-speed optical links comprising optical fibers. The networks may employ sensitive photo-detectors to detect the data being delivered. The trend is for the optics to be made increasingly smaller. Sensitive photo-detectors ranging from a few microns to a few dozen microns are now common.

Photo-detectors are commonly aligned to yield a maximum power output. However, the preferred performance of the photo-detector in a particular application may not be coincident with the maximum power output. Determination of the preferred performance of a photo-detector may be made possible by characterizing the responsivity of the photo-detector across the detector's photo-sensitive surface.

BRIEF SUMMARY

A light beam is focused on a photo-detector surface. The response of the photo-detector to the light is measured. The focused beam is then moved to another position on the photo-detector and the response is again measured. This process continues until the photo-detector surface is mapped to a predetermined level of detail.

A system for implementing the method is also disclosed.

Some implementations may provide one or more of the following advantages. Characterization of the photo-detector may reveal anomalies in the manufacturing process of fabricating the photo-detectors. Such anomalies may include lack of uniform responsivity of the photo-detector across the entire detector surface. The characteristics of the photo-detector may be used in determining a photo-detector alignment strategy, and characterization of the photo-detector surface may be used to analyze photo-detector failures.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
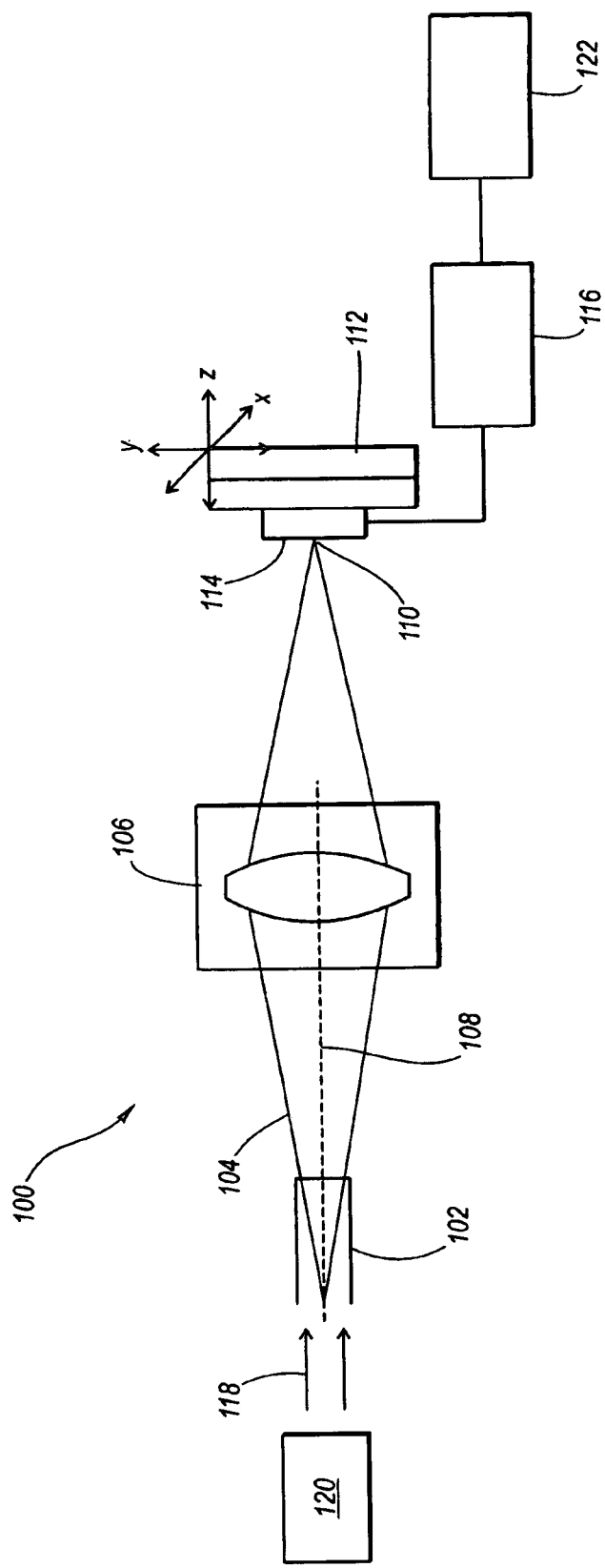
FIG. 1 illustrates an implementation for characterizing a photo-detector.

FIG. 1 illustrates a system 100 for characterizing a photo-detector. An optical fiber 102 directs light 104 exiting the fiber towards an optical conditioner 106. Optical fiber 102 and optical conditioner 106 share a common optical axis 108. The light exiting optical conditioner 106 is focused to a focal point 110 where a movable positioner 112 can interpose a photo-detector or other optical device under-test (DUT) 114 into the focused light. DUT 114 can be biased through circuitry (not shown) known to those of ordinary skill in the art. The output of the DUT 114 can be sampled and may be recorded in a computer or other output device 116. In some implementations a display device 122 may be coupled to the output device.

A laser or other light source 120 can be used to provide light input 118 at a particular wavelength. The light input is directed by optical fiber 102 towards optical conditioner 106. The optical fiber may be, for example, a single-mode fiber for transmission of the particular wavelength of laser light. The light beam 104 exiting the optical fiber 102 tends to diverge.

Optical conditioner 106 may be used to focus the exiting light beam 104 to a smaller spot size at focal point 110. In order to enhance the responsivity resolution, the focal point spot size may be significantly smaller than the surface of the DUT surface and, in some implementations, may be only a few microns. Positioner 112 moves the DUT 114 so that the light focal point scans across the surface of the DUT. DUTs of different designs, sizes and shapes may be characterized by using the positioner to cause the focused beam 110 to trace the surface of the DUT.

Output device 116 may be used to store, record, analyze or otherwise manipulate the response of the DUT to the light. The manipulated responses may be displayed on display device 122. The results of the characterization can be used for wafer analysis, manufacturing process control, failure analysis of failed parts, investigation of anomalous photo-detector responses, alignment strategy, and other purposes where the responsivity of the photo-detector surface may be useful.

Positioner 112 can include an automated alignment system. Although the particular positioner used is not critical, nano-positioners, known to those of ordinary skill in the art and capable of very small step movements, may be suitable for some applications. Positioner 112 moves DUT 114 in an X-Y plane normal to the focused light beam. Focal point 110 thus can be made incident on various surface points of the DUT. A responsivity profile of the DUT can be developed once proper focus between the optical fiber, optical conditioner and DUT is achieved.

Optical conditioner 106 may include a single lens or a system of lenses. The lens system may also allow a "sample" of the light to be extracted for calibration or other such purposes.

Figure 2:
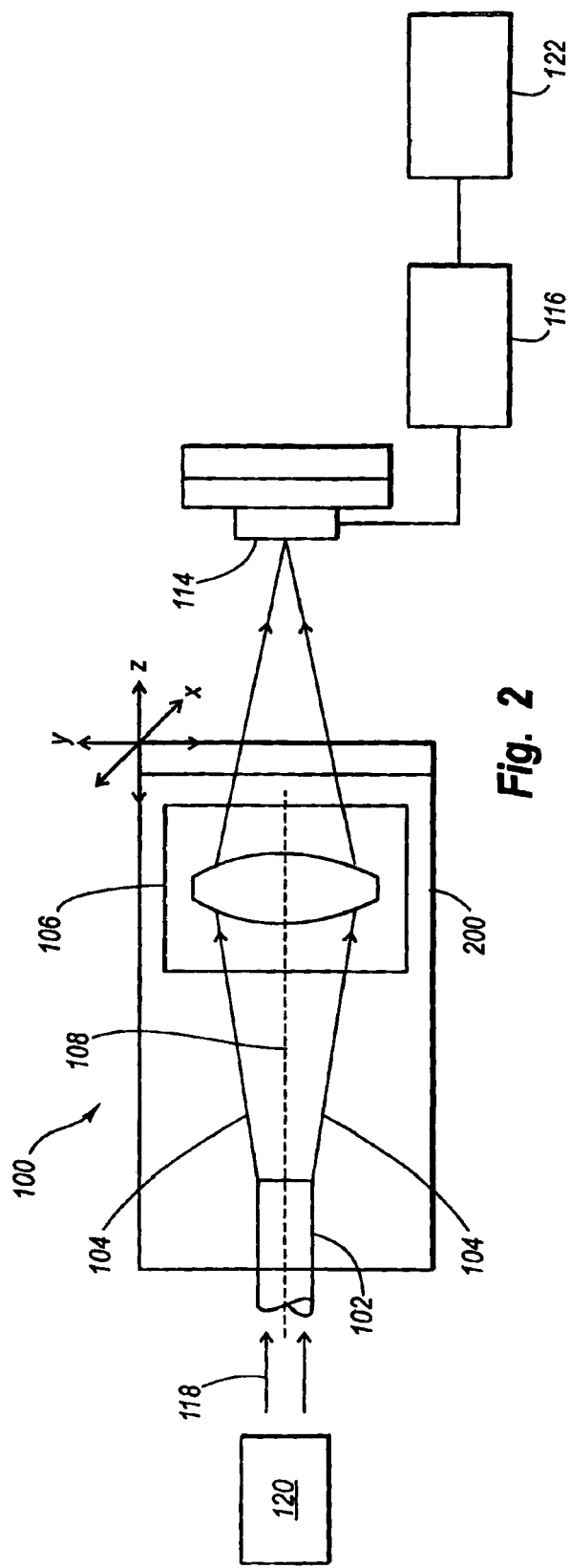
FIG. 2 illustrates an alternative implementation for characterizing a photo-detector.

FIG. 2A illustrates another alternative system for characterizing a photo-diode, according to one embodiment. The present system shown in FIG. 2A combines the positioning components of the embodiments shown in FIGS. 1 and 2. In detail, the system of FIG. 2A includes positioner 112 for moving DUT 114 as in the embodiment of FIG. 1, and positioner 200 for moving optical fiber 102 and optical conditioner 106 as in the embodiment of FIG. 2, in order to scan light beam 104 across the surface of the DUT.

The optical system can be aligned with, or part of, the DUT 114. In that arrangement the optical system may include a lens as part of the DUT, for example. The positioner can be used to move either the DUT/optical system or the optical fiber. A responsivity profile of the DUT may be developed once proper alignment between the optical fiber, optical conditioner and DUT is achieved.

Figure 3:
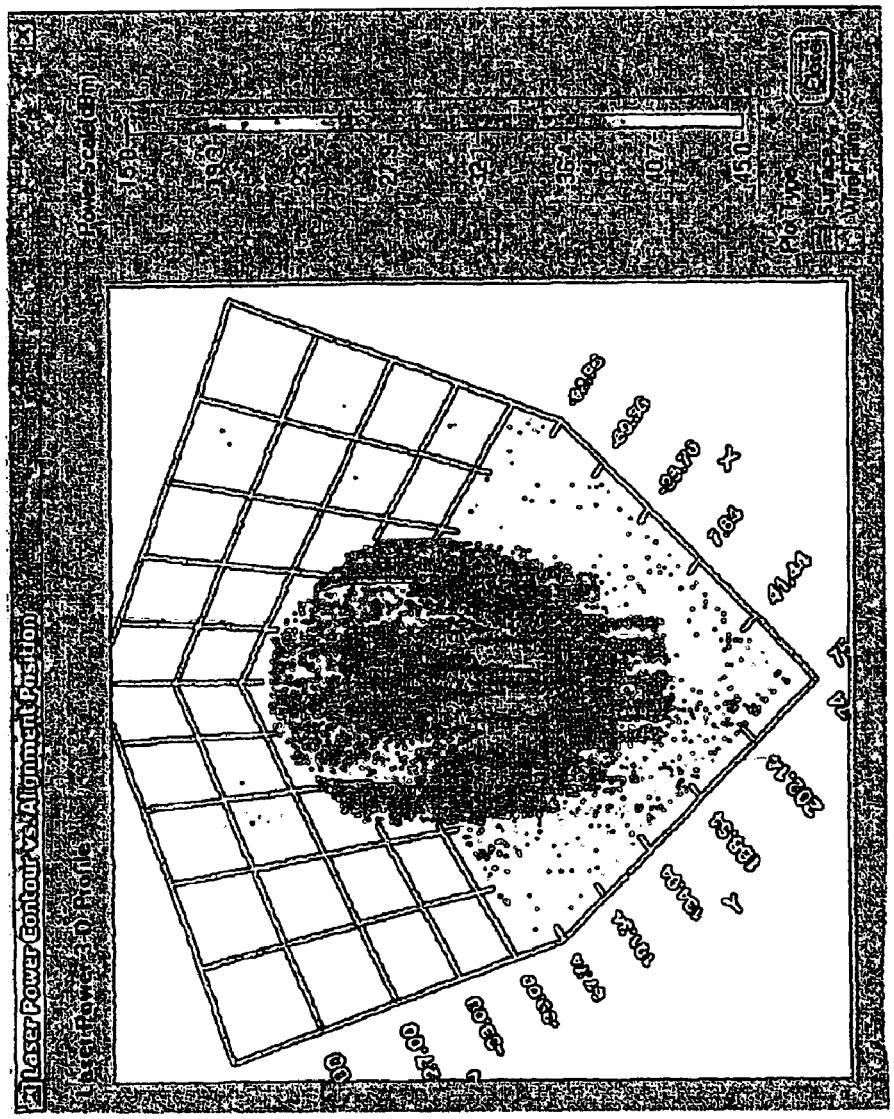
FIG. 3 is an illustration of a three-dimensional current-voltage (I-V) responsivity curve of a PIN diode.
Figure 4:
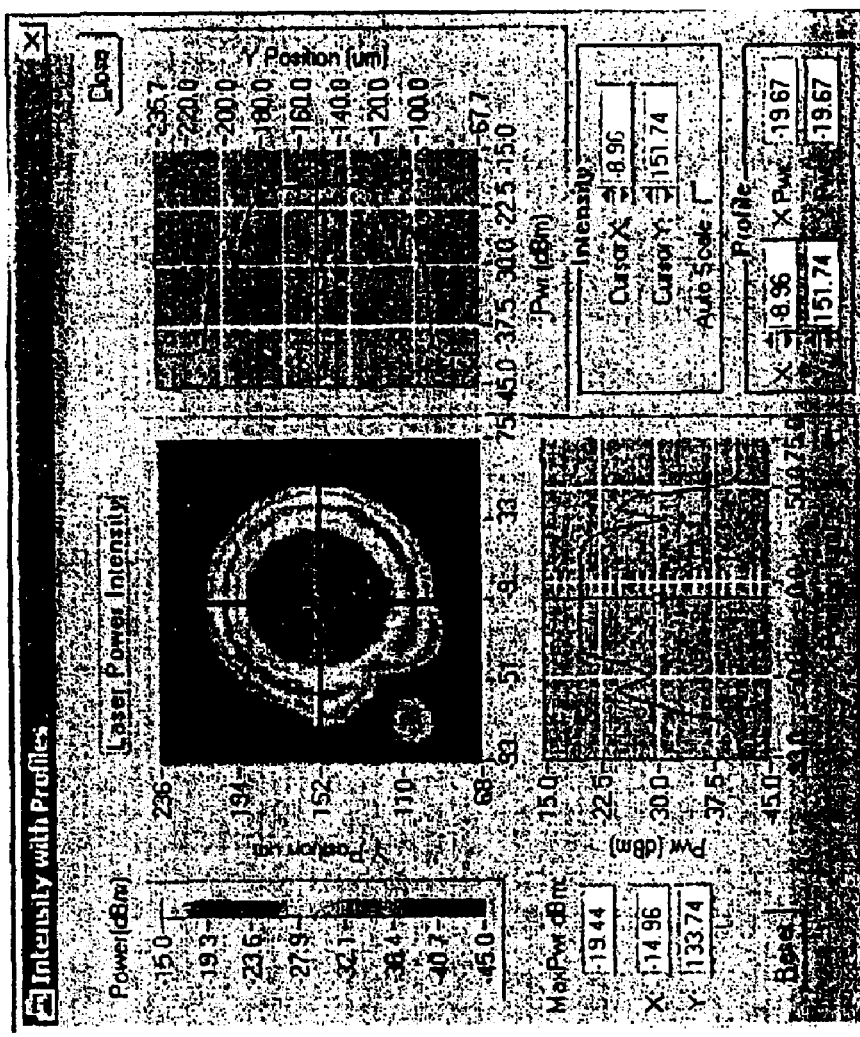
FIG. 4 is a two-dimensional representation of the responsivity curve of FIG. 3.

FIG. 3 illustrates a three-dimensional current-voltage (I-V)-curve analysis from a PIN diode developed from an implementation of the disclosed method. The X-Y plane is delineated in relative distances in length and width, respectively, across the surface of the PIN diode. The Z-axis is a power contour that plots the power, current or other measure of DUT responsivity at each X-Y position scanned at the focal point of FIG. 1. The particular responsivity contour of the PIN diode illustrated in FIG. 3 shows a substantially uniform responsivity across the entire detector surface. FIG. 4 illustrates the same PIN diode responsivity displayed in a two-dimensional profile.

Figure 5:
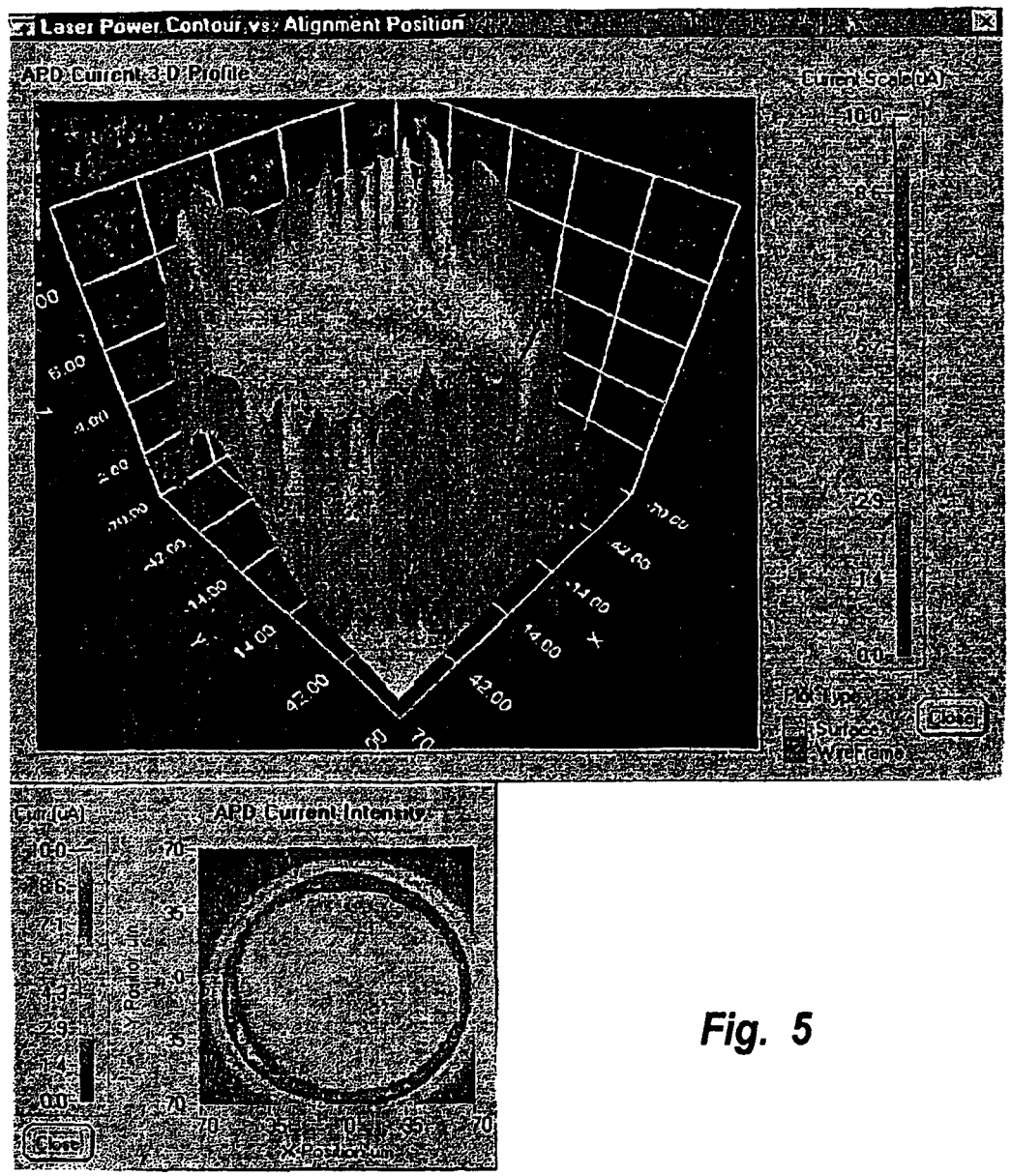
FIG. 5 is a three-dimensional I-V-curve for an avalanche photo-diode (APD).

FIG. 5 illustrates a three-dimensional I-V-curve analysis from an avalanche photo-diode (APD). The X-Y plane is delineated in relative distances in length and width, respectively, across the surface of the APD. The Z-axis is a power contour that plots the power, current or other measure of DUT responsivity at each X-Y position scanned at the focal point of FIG. 1. The particular responsivity contour of the APD illustrated in FIG. 5 exhibits significant edge effects and substantial non-uniform responsivity in the center region.

Other implementations are within the scope of the following claims.

What is claimed is:

1. A method of characterizing a photo-detector comprising:

by an optical fiber and an optical conditioner, focusing a single light beam on the photo-detector surface;

measuring a response of the photo-detector to the focused light beam;

by a positioner that moves the optical fiber and the optical conditioner, moving the focused light beam to another position on the photo-detector surface; and re-measuring the response of the photo-detector to the focused light beam.

2. The method of claim 1 further comprising:

repeatedly performing said moving and re-measuring; and characterizing the responsivity of the surface of the photo-detector based on the responses.

3. The method of claim 1 including recording the responses.

4. The method of claim 3 comprising using an automated alignment system to move the light beam.

5. The method of claim 1 including generating the light beam from a stationary laser.

6. The method of claim 5 further comprising directing the light beam to the optical conditioner through a single-mode optical fiber.

7. A system for characterizing the surface of a photo-detector comprising:

a stationary light source to provide a single light beam;

an optical conditioner to focus the light beam on the surface of the photo-detector;

an optical fiber to direct the light beam from the light source to the optical conditioner; and a positioner to move both the optical conditioner and the optical fiber so that the light beam moves across the surface of the photo-detector.

8. The system of claim 7 wherein the light source includes a laser.

9. The system of claim 7 wherein the positioner includes an automated alignment system.

10. The system of claim 9 wherein the automated alignment system includes a nano-positioner.

11. The system of claim 10 wherein the optical fiber is a single-mode optical fiber.

12. The system of claim 7 further comprising:

an output device coupled to the photo-detector to measure the output of the photo-detector; and a display coupled to the output device.

13. A system for characterizing the surface of a photo-detector comprising:

a stationary light source to provide a single light beam;

an optical conditioner to focus the light beam on the surface of the photo-detector;

an optical fiber to direct the light from the light source to the optical conditioner;

a positioner to move the optical conditioner and the optical fiber so that the light beam moves across the surface of the photo-detector;

an output device coupled to the photo-detector to measure the output of the photo-detector; and a display coupled to the output device.

14. The system of claim 13 wherein the light source includes a laser.

15. The system of claim 13 wherein the positioner includes an automated alignment system.

16. The system of claim 15 wherein the automated alignment system includes a nano-positioner.

17. The system of claim 1 wherein the optical fiber includes a single-mode optical fiber to direct the light beam towards the optical conditioner.

* * * * *

UNITED STATES PATENT AND TRADEMARK OFFICE
CERTIFICATE OF CORRECTION

PATENT NO. : 6,914,237 B2  Page 1 of 1
APPLICATION NO. : 10/150417
DATED : July 5, 2005
INVENTOR(S) : Shi et al.

It is certified that error appears in the above-identified patent and that said Letters Patent is hereby corrected as shown below:

Columns 2 & 3
Starting on line 64 of column 2 and ending on line 5 of column 3, remove the following paragraph:

> FIG. 2A illustrates another alternative system for characterizing a photo-diode, according to one embodiment. The present system shown in FIG. 2A combines the positioning components of the embodiments shown in FIGS. 1 and 2. In detail, the system of FIG. 2A includes positioner 112 for moving DUT 114 as in the embodiment of FIG. 1, and positioner 200 for moving optical fiber 102 and optical conditioner 106 as in the embodiment of FIG. 2, in order to scan light beam 104 across the surface of the DUT.

Column 3
Line 6, after "aligned with" insert --all--

Signed and Sealed this

Eighteenth Day of September, 2007

JON W. DUDAS
*Director of the United States Patent and Trademark Office*